(12) United States Patent
Takii

(10) Patent No.: US 10,640,154 B2
(45) Date of Patent: May 5, 2020

(54) VEHICLE FRAMEWORK STRUCTURE

(71) Applicant: TOYOTA JIDOSHA KABUSHIKI KAISHA, Toyota-shi (JP)

(72) Inventor: Shunsuke Takii, AIchi-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 113 days.

(21) Appl. No.: 16/005,070

(22) Filed: Jun. 11, 2018

(65) Prior Publication Data

US 2019/0009837 A1    Jan. 10, 2019

(30) Foreign Application Priority Data

Jul. 5, 2017    (JP) .................................. 2017-132163

(51) Int. Cl.
| | |
|---|---|
| *B62D 27/06* | (2006.01) |
| *B62D 27/02* | (2006.01) |
| *B62D 29/00* | (2006.01) |
| *B62D 21/03* | (2006.01) |
| *B62D 21/12* | (2006.01) |
| *B62D 25/08* | (2006.01) |
| *B62D 53/04* | (2006.01) |
| *B62D 63/02* | (2006.01) |

(Continued)

(52) U.S. Cl.
CPC .......... *B62D 27/065* (2013.01); *B62D 21/03* (2013.01); *B62D 21/12* (2013.01); *B62D 21/18* (2013.01); *B62D 25/085* (2013.01); *B62D 27/023* (2013.01); *B62D 29/008* (2013.01); *B62D 53/04* (2013.01); *B62D 63/025* (2013.01); *B62D 65/02* (2013.01)

(58) Field of Classification Search
CPC ..... B62D 21/12; B62D 21/152; B62D 27/065
See application file for complete search history.

(56) References Cited

U.S. PATENT DOCUMENTS

| | | | | |
|---|---|---|---|---|
| 2,327,585 A | * | 8/1943 | Ulrich .................... | B62D 21/09 52/787.1 |
| 3,586,119 A | | 6/1971 | Fullerton et al. | |

(Continued)

FOREIGN PATENT DOCUMENTS

| | | | | |
|---|---|---|---|---|
| DE | 1238349 B | * | 4/1967 | ........... B62D 27/065 |
| DE | 19633906 A1 | * | 2/1998 | ............. B62D 25/08 |

(Continued)

*Primary Examiner* — Nicole Y Verley
(74) *Attorney, Agent, or Firm* — Oblon, McClelland, Maier & Neustadt, L.L.P.

(57) ABSTRACT

There is provided a vehicle framework structure including: a left and right pair of side members that each extend in a vehicle front-rear direction; a support member that is disposed in close proximity to the pair of side members in the vehicle front-rear direction, and that extends in a vehicle width direction; projections that are each provided at the support member so as to project toward one or other of the side members; joint members, an end at a support member side of each of the side members being inserted into a respective one of the joint members and the joint members being joined to the support member; and first bolts that fasten joint members that are abutted against the projections in the vehicle width direction, and fasten the side members inserted into the joint members, to the projections.

8 Claims, 9 Drawing Sheets

(51) Int. Cl.
  *B62D 21/18* (2006.01)
  *B62D 65/02* (2006.01)

(56) References Cited

U.S. PATENT DOCUMENTS

| | | | | |
|---|---|---|---|---|
| 3,633,934 | A * | 1/1972 | Wilfert | B60R 19/34 |
| | | | | 280/784 |
| 5,320,403 | A * | 6/1994 | Kazyak | B62D 23/005 |
| | | | | 296/203.01 |
| 6,604,884 | B1 * | 8/2003 | Ohkura | B60D 1/56 |
| | | | | 403/187 |
| 6,893,065 | B2 * | 5/2005 | Seksaria | B60K 5/12 |
| | | | | 293/133 |
| 8,308,184 | B2 * | 11/2012 | Hodoya | B60D 1/56 |
| | | | | 280/495 |
| 9,228,628 | B2 * | 1/2016 | Alavandi | B60R 19/34 |
| 9,550,463 | B2 * | 1/2017 | Hara | B60R 19/34 |
| 9,567,013 | B2 * | 2/2017 | Ehrlich | B62D 27/02 |
| 9,764,765 | B2 * | 9/2017 | Takeda | B62D 21/152 |
| 9,862,420 | B2 * | 1/2018 | Kato | B62D 25/2027 |
| 9,896,135 | B2 * | 2/2018 | Nakamoto | B62D 21/02 |
| 9,908,564 | B1 * | 3/2018 | Grattan | B62D 21/155 |
| 10,040,483 | B2 * | 8/2018 | Matsuura | B62D 25/2027 |
| 10,077,014 | B1 * | 9/2018 | Chiang | B60R 19/02 |
| 10,118,644 | B2 * | 11/2018 | Grattan | B62D 21/07 |
| 10,137,873 | B2 * | 11/2018 | Bowers | B60T 8/4031 |
| 10,167,019 | B2 * | 1/2019 | Ayuzawa | B62D 25/04 |
| 2003/0085592 | A1 * | 5/2003 | Seksaria | B60K 5/12 |
| | | | | 296/187.09 |
| 2006/0237996 | A1 | 10/2006 | Eipper et al. | |
| 2007/0176406 | A1 * | 8/2007 | Ruehl | B62D 21/00 |
| | | | | 280/785 |
| 2015/0210330 | A1 * | 7/2015 | Ezzat | B62D 25/082 |
| | | | | 296/190.01 |
| 2016/0068193 | A1 * | 3/2016 | Koike | B62D 25/082 |
| | | | | 296/187.09 |
| 2018/0339732 | A1 * | 11/2018 | Takii | B62D 21/02 |
| 2019/0023321 | A1 * | 1/2019 | Ayukawa | B62D 21/11 |
| 2019/0152548 | A1 * | 5/2019 | Shimizu | B62D 65/12 |
| 2019/0193792 | A1 * | 6/2019 | Saeki | B62D 27/065 |

FOREIGN PATENT DOCUMENTS

| | | | | |
|---|---|---|---|---|
| DE | 202019103028 U1 * | 6/2019 | | B60J 7/08 |
| EP | 2070754 A1 * | 6/2009 | | B60K 1/04 |
| EP | 3421332 A1 * | 1/2019 | | B62D 25/04 |
| FR | 622076 A * | 5/1927 | | B62D 21/02 |
| FR | 2892690 A1 * | 5/2007 | | B62D 21/12 |
| GB | 2109433 A * | 6/1983 | | B62D 21/09 |
| JP | 2005-537179 | 12/2005 | | |
| JP | 2019010924 A * | 1/2019 | | B62D 25/081 |

* cited by examiner

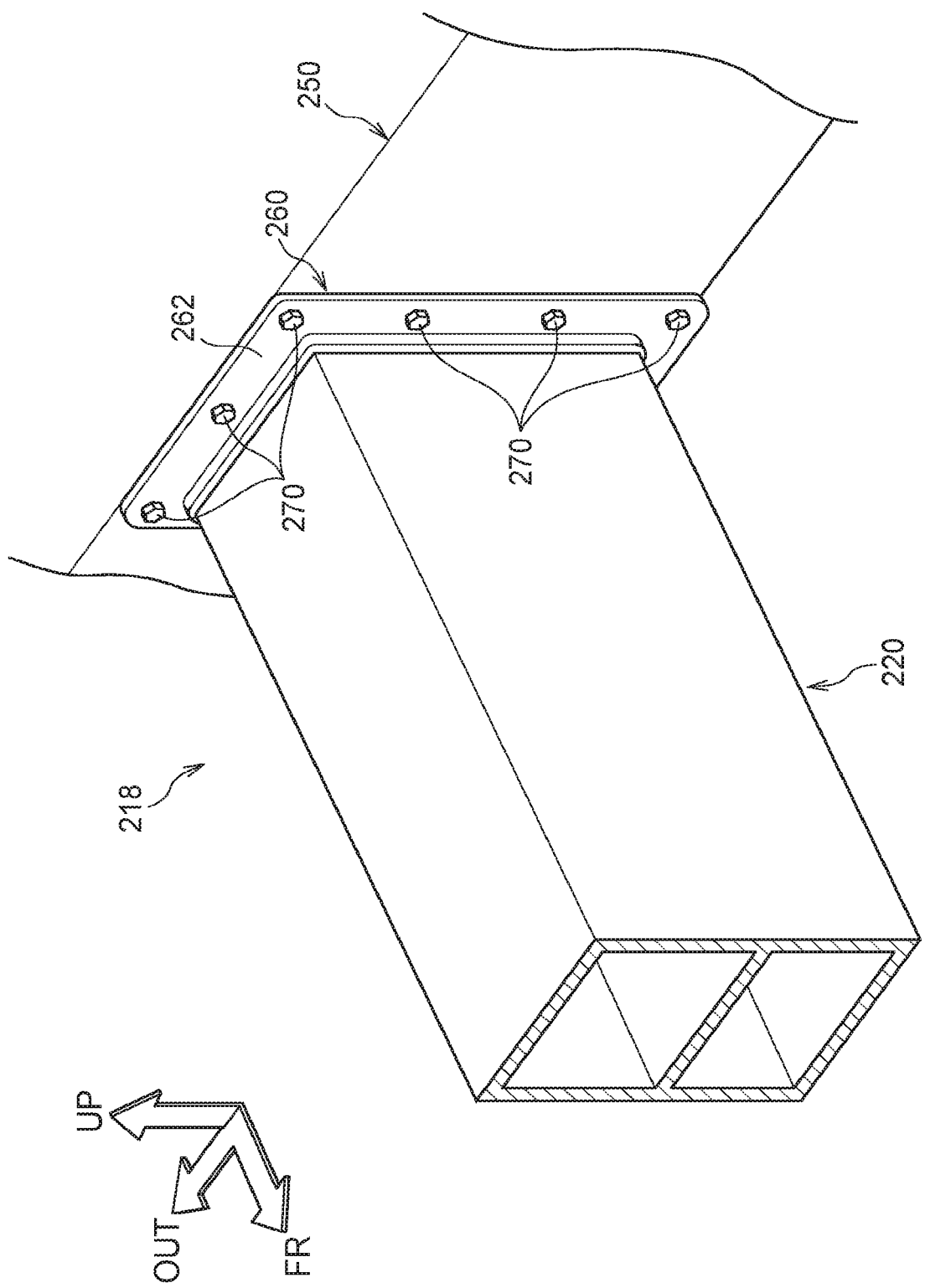

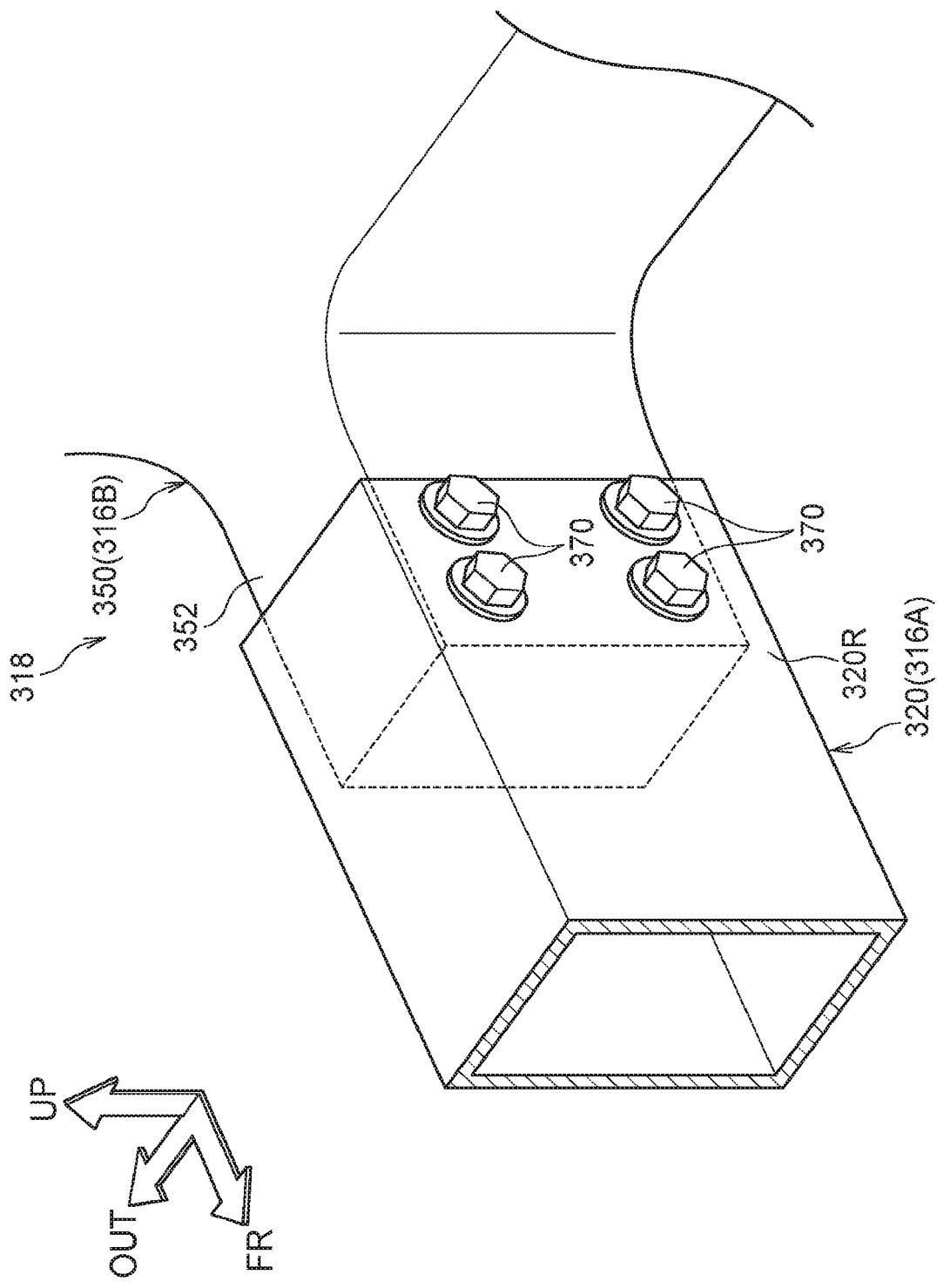

VEHICLE FRAMEWORK STRUCTURE

CROSS-REFERENCE TO RELATED APPLICATION

This application is based on and claims priority under 35 USC 119 from Japanese Patent Application No. 2017-132163 filed on Jul. 5, 2017, the disclosure of which is incorporated by reference herein.

BACKGROUND

Technical Field

The present disclosure relates to a vehicle framework structure.

Related Art

Japanese National-Phase Publication No. 2005-537179 discloses a body structure formed by combining a base (floor) module, a front end module, a roof module, and a rear section module. Each of the modules are joined together by adhesive bonding or welding.

In a body structure such as that disclosed in Japanese National-Phase Publication No. 2005-537179, opposing framework members are joined together by flanges. The flange-joined portions are sometimes a weakness when trying to secure coupling rigidity. Moreover, it is difficult to improve the precision of assembly when joining with flanges.

SUMMARY

An object of the present disclosure is to provide a vehicle framework structure having improved coupling rigidity when framework members are assembled together, and for which assembly precision is improved.

A vehicle framework structure of a first aspect includes a left and right pair of side members, a support member, projections, joint members, and first bolts. The side members each extend in a vehicle front-rear direction. The support member is disposed in close proximity to the pair of side members in the vehicle front-rear direction, and extends in a vehicle width direction. The projections are each provided at the support member so as to project toward one or other of the side members. An end at a support member side of each of the side members is inserted into a respective one of the joint members and the joint members are joined to the support member. The first bolts fasten joint members that are abutted against the projections in the vehicle width direction, and fasten the side members inserted into the joint members, to the projections.

In the vehicle framework structure of the first aspect, the side members that are framework members of a vehicle are joined to the support member through the joint members. When the present disclosure is applied to a framework structure of a vehicle front section, front side members correspond to the "side members". In such cases, a member that supports the front side members and is, for example, a dash cross-member, a dash panel, a floor side member, or a member joined to any of the above corresponds to the "support member". The projections are provided at the support member so as to project toward the respective side member side (the vehicle front side when the side member is a front side member), and the joint members into which the side members are inserted abut the projections in the vehicle width direction. The side members and the joint members are fastened to the projections by the first bolts.

According to the vehicle framework structure of the first aspect, the coupling rigidity can be improved due to being able to overlap the framework members in a shear direction (vehicle width direction). Moreover, assembly precision of the framework members can be improved due to being able to adjust an insertion position of the side members to the joint members.

In a vehicle framework structure of a second aspect, the support member includes a body section that acts as a base for the projections in a direction opposite to a projection direction of the projections. Furthermore, the joint members each include an insertion portion into which the respective side member is inserted, and an extension portion that extends from the insertion portion toward the body section side and that is configured to abut a face on a vehicle width direction side of the body section.

In the vehicle framework structure of the second aspect, the side members are joined to the support member through the joint members, increasing the number of joining locations in the vehicle width direction. Namely, as well as the projections of the support member and the joint members being joined, a face of the support member on the vehicle width direction side of the body section and the extension portion of the joint member are also joined together. The vehicle framework structure of the second aspect enables the coupling rigidity to be further improved in a shear direction (vehicle width direction).

In the vehicle framework structure of a third aspect, the joint members each include a pair of plate-shaped support plates configured to sandwich the side members, and a plate-shaped coupling plate that couples ends of the pair of support plates on the body section side together. Each extension portion is a plate portion that extends from the respective coupling plate toward the body section side.

A feature of the vehicle framework structure of the third aspect is that the joint members are formed by plate-shaped members. Namely, the vehicle framework structure of the third aspect enables the number of manufacturing processes to be decreased and cost to be reduced by enabling the joint member to be formed by processing a metal extrusion.

In a vehicle framework structure of a fourth aspect, the support member is made from die-cast aluminum.

According to the vehicle framework structure of the fourth aspect, both an increase in strength and a reduction in weight can be achieved due to employing the support member made from die-cast aluminum.

In a vehicle framework structure of a fifth aspect, the side members each have a closed cross-section structure, the first bolts are inserted through cylindrical bodies that are each made from metal and abut opposing inner wall faces of the respective side member.

In the vehicle framework structure of the fifth aspect, in the side members that bear compressional force from fastening the first bolts, the inner wall faces in the insertion direction of the first bolts are supported by the cylindrical bodies bearing the compressional force. According to the vehicle framework structure of the fifth aspect, the coupling rigidity can be further improved in a shear direction (vehicle width direction) due to being able to suppress deformation of the side members of closed cross-section structure along the insertion direction of the first bolts.

The present disclosure is able to improve coupling rigidity when framework members have been assembled together, and is also able to improve the assembly precision thereof.

BRIEF DESCRIPTION OF THE DRAWINGS

Exemplary embodiments of the present disclosure will be described in detail based on the following figures, wherein:

FIG. 8 is a perspective view illustrating a vehicle framework structure according to a second comparative example; and FIG. 9 is a perspective view illustrating a vehicle framework structure according to a third comparative example.

DETAILED DESCRIPTION

First Exemplary Embodiment

Figure 1:
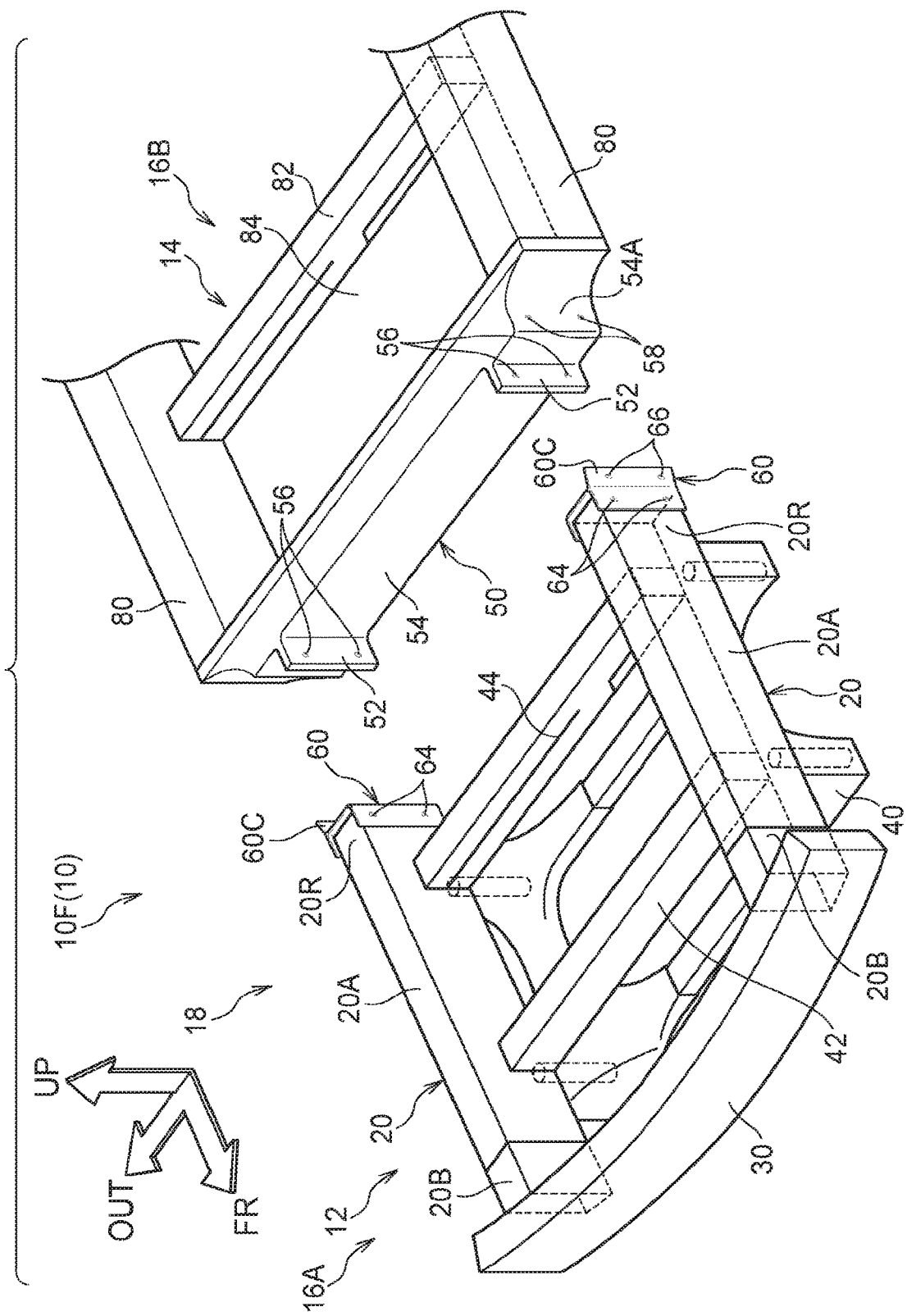
FIG. 1 is a perspective view illustrating a vehicle framework structure according to a first exemplary embodiment.

A description follows regarding a vehicle framework structure 18 according to a first exemplary embodiment of the present disclosure, with reference to FIG. 1 to FIG. 5. Note that in the drawings the arrow FR points toward the vehicle front, the arrow UP points toward the vehicle upper side, and the arrow OUT points toward the vehicle width direction outer side. Moreover, as a front section of the vehicle is basically configured with left-right symmetry, only the vehicle right side is illustrated and described.

A vehicle 10 to which the vehicle framework structure 18 of the present exemplary embodiment is applied is configured by plural vehicle body modules. Specifically, the vehicle 10 is configured including a front module 16A, a floor module 16B, a rear module (not illustrated in the drawings), and a roof module (not illustrated in the drawings). FIG. 1 is a perspective view illustrating a front section of the vehicle 10 (referred to below as "vehicle front section 10F"), in a state prior to assembling a front module 16A to a floor module 16B. Note that bolts (first bolts) 70 and bolts (second bolts) 72 that fasten the front module 16A and the floor module 16B together are omitted from illustration in FIG. 1.

The front module 16A is a module that configures a vehicle front chamber 12, and is configured including front side members 20, a bumper reinforcement 30, a suspension member 40, and front cross-members 42, 44. Note that an engine compartment for housing an internal combustion engine, and, for example, a space for housing a drive source such as a motor for an electric car, are contained in the vehicle front chamber 12. The floor module 16B is a module configuring a vehicle cabin 14, and is configured including a dash cross-member 50, rockers 80, floor cross-members 82, and a floor panel 84. In the vehicle framework structure 18 of the present exemplary embodiment, the front module 16A is joined to the floor module 16B through a joint member 60, described below. Detailed explanation follows regarding the structure of each of the modules.

Front Module

As illustrated in FIG. 1, the front module 16A includes a pair of the front side members (side members) 20, and the bumper reinforcement 30 that is joined to a vehicle front side of the front side members 20. The front module 16A includes the front cross-members 42, 44 that connect the pair of front side members 20 together, and the suspension member 40 that is joined to a vehicle lower side of the front side members 20.

The front side members 20 are a pair of framework members respectively provided on the left and right in the vehicle width direction. The front side members 20 extend along the vehicle front-rear direction, and are provided symmetrically to a width direction center of the vehicle 10. The front side members 20 each have a rectangular shaped closed cross-section when viewed in cross-section from the vehicle front, with a long side of the rectangular shape running along the vehicle vertical direction. A rib 22 (see FIG. 2) is provided to each of the front side members 20 that have closed cross-section structures, so as to divide the inside of the closed cross-section into a top and bottom. Through holes 24 are formed through vehicle rear end sections of the front side members 20 (referred to below as "rear end sections 20R"), with the through holes 24 being formed alongside each other in the vehicle vertical direction (see FIG. 5). The through holes 24 are used to pass the bolts 70 through, described below.

The vicinity of a vehicle front end of each of the front side members 20 configures a low-strength section 20B. The low-strength section 20B is set with a lower strength against vehicle front-rear direction load than that of a general section 20A at the vehicle rear thereof. The low-strength section 20B is set, for example, by employing a method such as joining a crash box, which was formed separately from the general section 20A of the front side members 20, to the vehicle front side of the general section 20A. A rear end section 20R of each of the front side members 20 is joined to the dash cross-member 50 through a joint members 60, described below. The front side members 20 function to absorb collision energy during a front-on collision by compressing along their length direction.

The bumper reinforcement 30 that extends along the vehicle width direction is provided so as to couple the pair of front side members 20 together at the vehicle front side of the left and right pair of front side members 20. The bumper reinforcement 30 is formed with a bow shape in vehicle plan view, curving toward the vehicle rear on progression toward the vehicle width direction outer sides. An absorber (not illustrated in the drawings) made, for example, from a foamed resin is disposed at the vehicle front of the bumper reinforcement 30, together with a bumper cover (not illustrated in the drawings) disposed so as to cover the absorber and configuring a styling face of the vehicle.

The suspension member 40 is provided at the vehicle lower side of the left and right pair of front side members 20 to support a left and right pair of suspension arms (not illustrated in the drawings). The suspension member 40 is joined to the left and right pair of front side members 20 from the vehicle lower side thereof.

The front cross-members 42, 44 are provided between the left and right pair of front side members 20. The front cross-members 42, 44 couple the pair of front side members 20 together in the vehicle width direction, and are oriented with their length directions parallel to the vehicle width direction. The front cross-members 42, 44 are coupled to the front side members 20 by welding or the like.

Floor Module

As illustrated in FIG. 1, the floor module 16B includes the dash cross-member 50 extending in the vehicle width direction, and the pair of rockers 80 that extend toward the vehicle rear from the two vehicle width direction ends of the dash cross-member 50. The floor module 16B includes plural floor cross-members 82 that connect the pair of rockers 80 together, and the floor panel 84 that covers portions (open portions) surrounded by the dash cross-member 50 and the floor cross-member 82. The floor cross-member 82 couple the pair of rockers 80 together along the vehicle width direction. The floor cross-members 82 are oriented with their length directions parallel to the vehicle width direction. The plural floor cross-member 82 are joined to the rockers 80 by welding or the like.

The dash cross-member 50 is a support member that supports the front side members 20, and is a framework member made from die-cast aluminum, or a framework members made from a composite of die-cast aluminum and an extruded material. The dash cross-member 50 includes a body section 54 extending along the vehicle width direction, and a pair of projections 52 that project from the body section 54 toward the vehicle front. In other words, the body section 54 acts as a base disposed at the vehicle rear of the projections 52.

The body section 54 is formed with step that projects toward the vehicle front, except at regions at the vehicle width direction ends in plan view. The faces on the vehicle width direction outer side of the steps are configured as side face portions 54A. A pair of threaded holes 58 are formed in the side face portions 54A, with the threaded holes 58 being formed alongside each other in the vehicle vertical direction. The threaded holes 58 are used when the bolts 72, described below (see FIG. 2) are screwed therein. The projections 52 are a pair of plate shaped portions provided slightly to the inside of the two vehicle width direction ends (the side face portions 54A) of the body section 54. A pair of threaded holes 56 are formed so as to pass through from faces on the vehicle width direction outer side of the projections 52 to faces on the inner side thereof. The threaded holes 56 are formed alongside each other in the vehicle vertical direction. The threaded holes 56 are used when the bolts 70, described below (see FIG. 2) are screwed therein.

Joint Member

The joint members 60 are members for joining the front module 16A and the floor module 16B together. More precisely, the joint members 60 are members for joining the front side members 20 and the dash cross-member 50 together.

Figure 2:
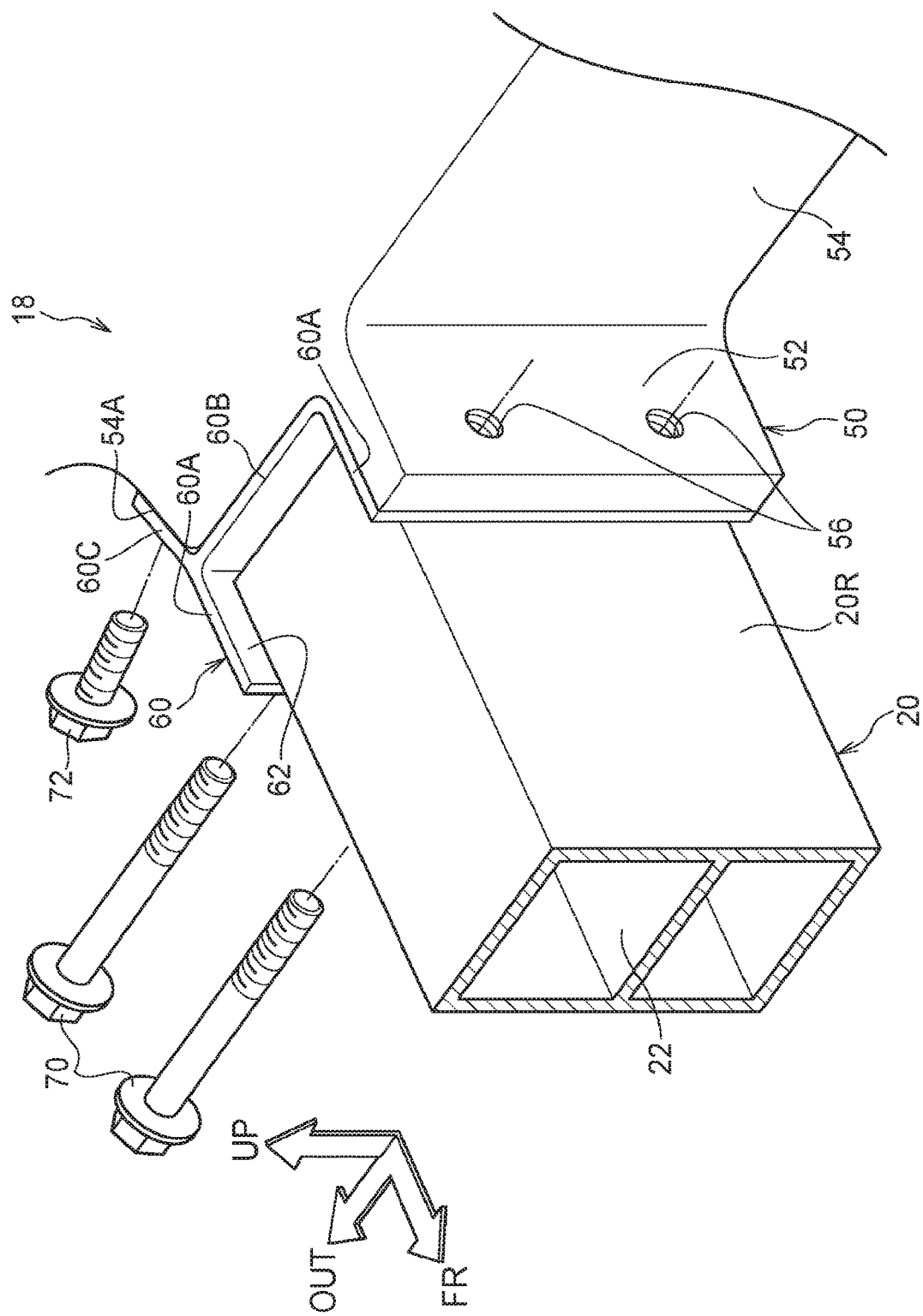
FIG. 2 is an enlargement (perspective view) of a joint portion in FIG. 1.
Figure 3:
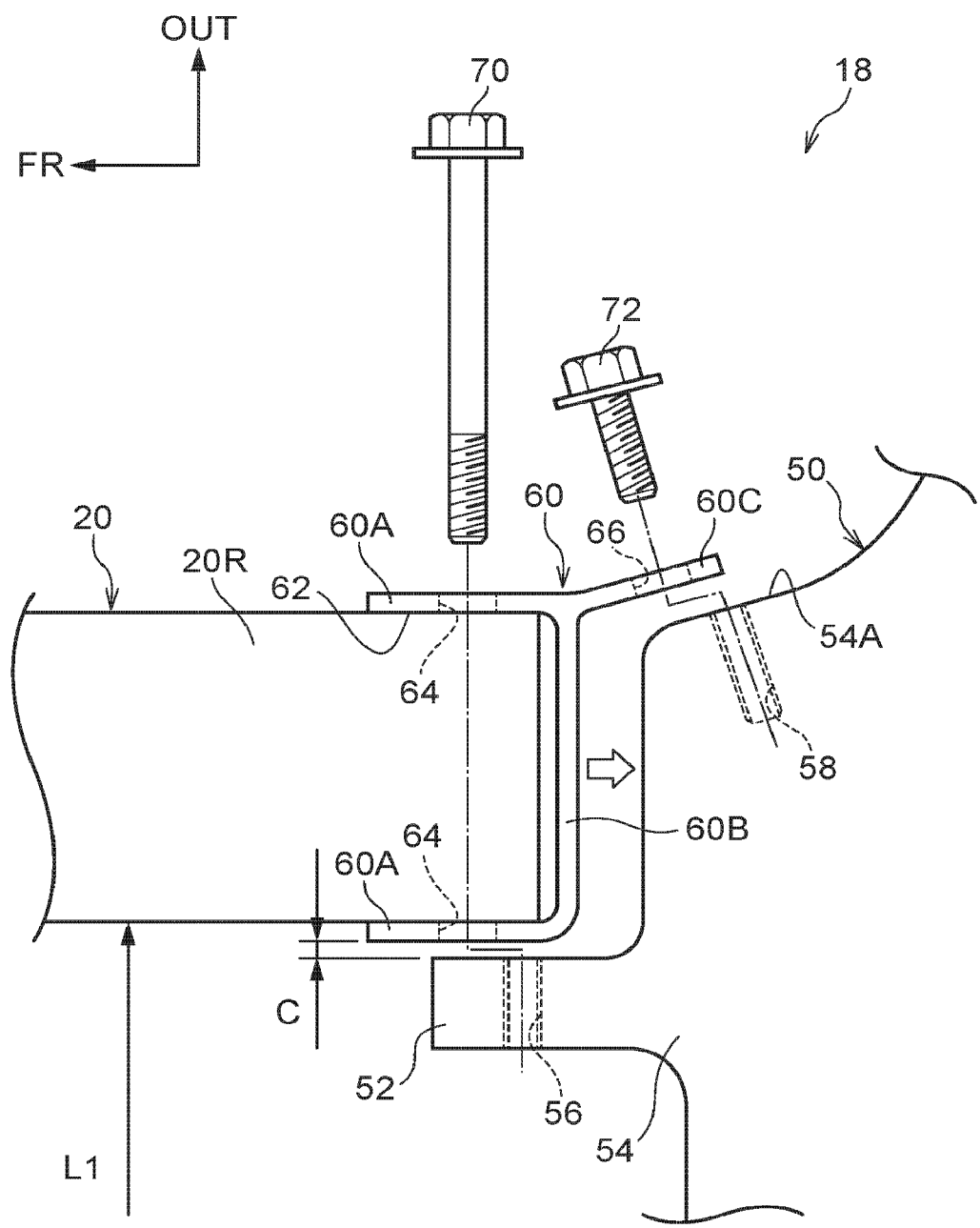
FIG. 3 is a plan view illustrating a vehicle framework structure according to the first exemplary embodiment, in a state prior to joining a front side member to a dash cross-member.

FIG. 2 and FIG. 3 are enlarged diagrams of one of the joint members 60. The joint members 60 each include a pair of plate-shaped support plates 60A that sandwich the respective front side member 20, a plate-shaped coupling plate 60B that couples the vehicle rear ends of the pair of support plates 60A together, and an extension plate 60C that is a plate-shaped extension portion extending from the coupling plate 60B toward the vehicle rear. The joint member 60 is formed by cutting an extruded aluminum member having an h-shaped cross-section in plan view.

A portion enclosed by the pair of support plates 60A and the coupling plate 60B forms an insertion portion 62 into which the rear end section 20R of the respective front side member 20 is inserted. The distance between the opposing support plates 60A is set so as to be the same as, or slightly wider than, the width (the dimension in the vehicle width direction) of the front side member 20. The rear end section 20R of the front side member 20 is accordingly insertable from the vehicle front side into the insertion portion 62.

Figure 5:
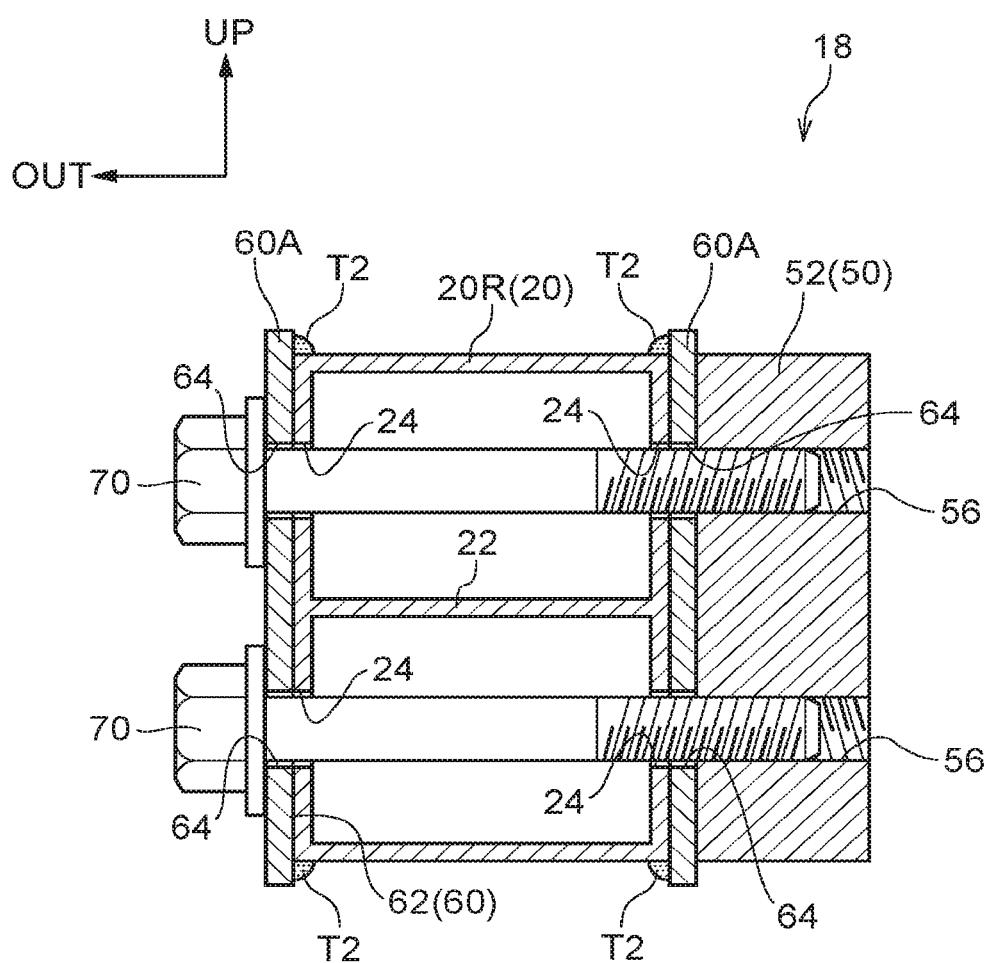
FIG. 5 is a cross-section as viewed from the front of a vehicle framework structure according to the first exemplary embodiment (a cross-section taken along A-A in FIG. 4)

Respective insertion holes 64 are formed in the support plates 60A alongside each other in the vehicle vertical direction (see FIG. 1 and FIG. 5). The insertion holes 64 are used when the bolts 70, described below, are passed therethrough. The distance between the centers of the upper and lower insertion holes 64 is the same as the distance between the centers of the pair of through holes 24 formed in the front side member 20, and the same as the distance between the centers of the pair of threaded holes 56 formed in the dash cross-member 50.

Insertion holes 66 are formed in the extension plate 60C alongside each other in the vehicle vertical direction (see FIG. 1). The insertion holes 66 are used when the bolts 72, described below, are passed therethrough. The distance between the centers of the upper and lower insertion holes 66 is the same as the distance between the centers of the pair of threaded holes 58 formed in the dash cross-member 50.

Figure 4:
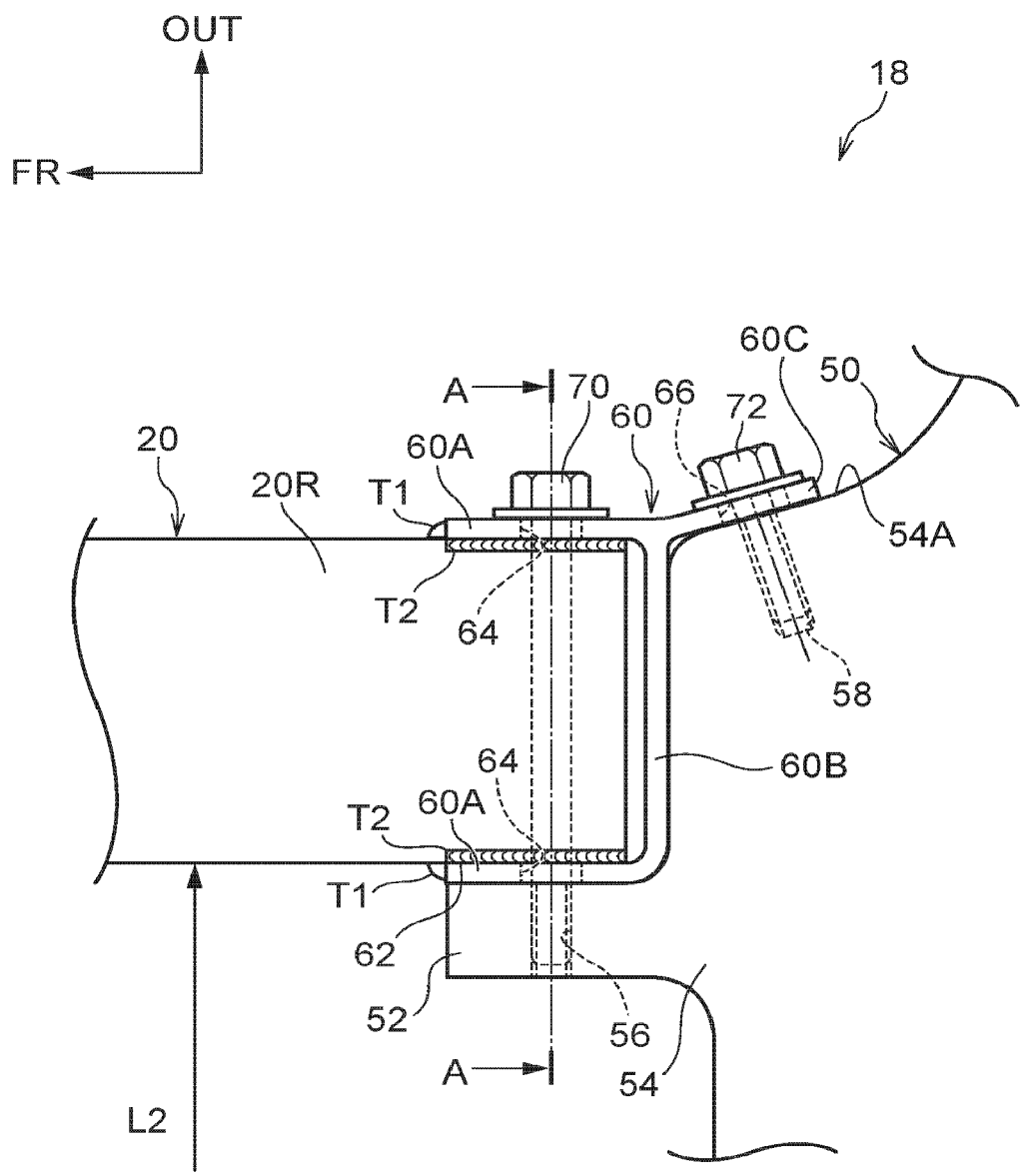
FIG. 4 is a plan view illustrating a vehicle framework structure according to the first exemplary embodiment, in a state after joining a front side member to a dash cross-member.

As illustrated in FIG. 2 and FIG. 4, when each of the joint members 60 is joined to the dash cross-member 50, the respective support plate 60A on the width direction inner side abuts the width direction outer side face of the projection 52, and the extension plate 60C abuts the side face portion 54A. The positions of the insertion holes 64 on the support plate 60A side, the through holes 24, and the threaded holes 56 are aligned with each other along the vehicle width direction when this is performed (see FIG. 5). This accordingly enables the bolts 70 to be passed through the insertion holes 64 and the through holes 24, and screwed into the threaded holes 56. The positions of the insertion holes 66 on the extension plate 60C side and the threaded holes 58 are also aligned with each other. This accordingly enables the bolts 72 to be passed through the insertion holes 66 and screwed into the threaded holes 58.

Moreover, the joint members 60 are fixed to the front side members 20 by welding. Specifically, as illustrated in FIG. 4 and FIG. 5, the respective boundary portions between the front side members 20 and the joint members 60 are arc welded. Welds T1 are formed by arc welding at the respective corners formed between the vehicle front side faces of the support plates 60A and the side faces of the front side members 20 (the vehicle width direction side faces) (see FIG. 4). Moreover, welds T2 are formed by arc welding at the respective corners formed between the faces on the inside (the front side member 20 side) of the support plates 60A and the upper and lower faces (faces on the vehicle upper side and lower side) of the front side member 20.

Vehicle Module Assembly Process

Description follows regarding a process for assembling the front module 16A and the floor module 16B. Specifically, a process will be described in which the front side member 20 is joined to the dash cross-member 50 through the joint members 60.

First, as illustrated in FIG. 1 and FIG. 3, the pair of front side members 20 are each inserted into the respective joint member 60. Namely, the rear end section 20R of each of the left and right front side members 20 is placed inside the insertion portion 62 formed by the respective pair of support plates 60A and coupling plate 60B. The extension plate 60C is placed so as to be positioned at the vehicle width direction outer side when this is performed. When doing so, the insertion position of the front side member 20 in the insertion portion 62 can be adjusted such that the position of the front side members 20 with respect to the dash cross-member 50 is a designed-for value. The positions of the front module 16A and the floor module 16B are thereby adjustable to a designed-for value. The boundary portions between the front side members 20 and the joint members 60 are then arc welded so as to fix both together (see FIG. 4 and FIG. 5).

Next, the front module 16A installed with the joint members 60 is moved toward the floor module 16B, and the front side members 20 are joined to the dash cross-member 50. A distance L1 (see FIG. 3) between the left and right front side members 20 prior to being joined to the dash cross-member 50 is preferably slightly longer than a distance L2 (see FIG. 4) between the left and right front side members 20 after being joined. Were the distance between the left and right front side members 20 to be pre-set to the post-joining distance L2, this being the designed-for value, then the rear end section 20R (the joint member 60) of each of the front side members 20 would contact the projection 52 when the front module 16A approaches the floor module 16B, making assembly difficult. In contrast thereto, by setting the distance between the left and right front side members 20 to the distance L1, which is wider than the distance L2, a clearance C can be provided between the joint member 60 and the projection 52, as illustrated in FIG. 3. Thereby, the rear end sections 20R (the joint members 60) of the front side members 20 do not contact the projections 52 when the front module 16A approaches the floor module 16B, enabling the rear end sections 20R of the front side members 20 to be moved to the positions for joining to the dash cross-member 50 (see FIG. 4).

Then, as illustrated in FIG. 4 and FIG. 5, the bolts 70 are passed through the insertion holes 64 and the through holes 24 from the vehicle width direction outer side, and screwed into the threaded holes 56. The bolts 72 are also passed through the insertion holes 66 from the vehicle width direction outer side and screwed into the threaded holes 58. When the bolts 70 and the bolts 72 have been fastened, the clearance C (see FIG. 3) provided for when moving the front module 16A to the floor module 16B becomes zero. This concludes the assembly process to assemble the vehicle body modules together by joining the front module 16A and the floor module 16B together by arc welding and fastening the bolts 70 and the bolts 72.

Note that the welding of the front side members 20 and the joint members 60 may be performed after fastening the bolts 70 and the bolts 72. In such cases, the bolts 70 are provisionally tightened, and then fastened after positioning the front side members 20. Due to the internal diameter of the through holes 24 being larger than the external diameter of the bolts 70, the front side members 20 can be moved in the vehicle front-rear direction with respect to the dash cross-member 50. Note that the through holes 24 may be formed as elongated holes with their length along the vehicle front-rear direction. The insertion position of the front side members 20 into the insertion portion 62 is adjusted such that the position of the front side members 20 with respect to the dash cross-member 50 becomes the designed-for value. Namely, the positions of the front module 16A and the floor module 16B are adjusted to the designed-for values. When the insertion positions of the front side members 20 with respect to the insertion portions 62 have been adjusted, the bolts 70 are then fastened. The boundary portions between the front side members 20 and the joint members 60 and then also arc welded.

Operation and Advantageous Effects

The operation and advantageous effects of the present exemplary embodiment will now be described in comparison to comparative examples.

First, as described above, the vehicle framework structure 18 of the present exemplary embodiment is a structure in which the front side members 20, which are framework members, are joined to the dash cross-member 50 through the joint members 60. A feature of this structure is that the front side members 20 and the joint members 60, and the joint members 60 and the dash cross-member 50, overlap with each other in the vehicle width direction.

Figure 7:
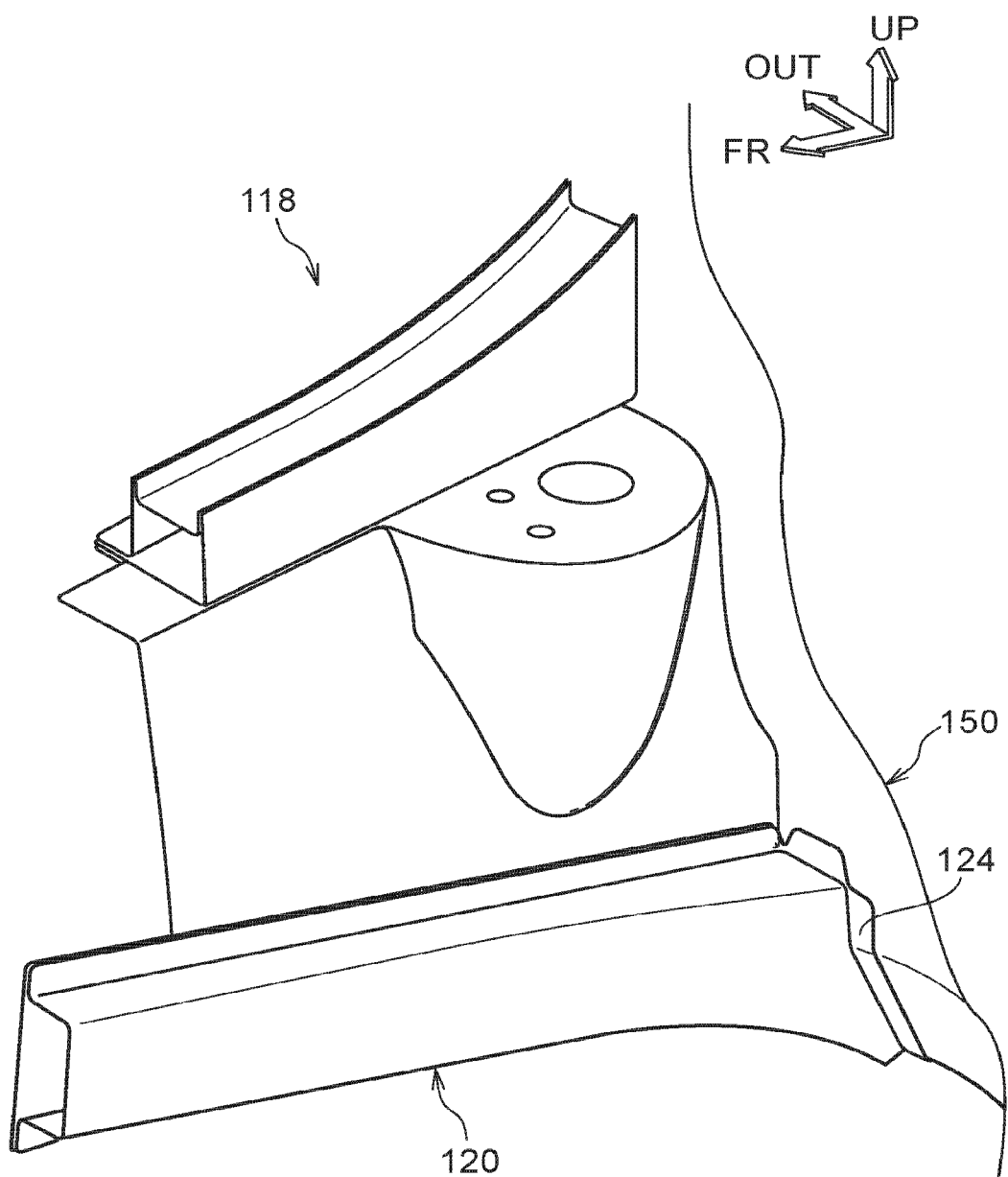
FIG. 7 is a perspective view illustrating a vehicle framework structure according to a first comparative example.

A vehicle framework structure 118 of a first comparative example is a structure in which front side members are joined to a dash panel through flanges provided to the front side members. As illustrated in FIG. 7, in the first comparative example there are flanges 124 provided on the vehicle rear side of front side members 120 extending in the vehicle front-rear direction. The front side members 120 are joined to a dash panel 150 by spot welding to join the flanges 124 to the dash panel 150.

In the vehicle framework structure 118 of the first comparative example, there are no portions where members overlap in the vehicle width direction at the locations where the front side members 120 and the dash panel 150 are joined. Force input in the vehicle vertical direction and the vehicle width direction must accordingly be withstood by the spot welded portions alone. Moreover, in the first comparative example it is difficult to secure rigidity using the flanges 124. For these reasons it is difficult to improve the coupling rigidity in the vehicle framework structure 118 of the first comparative example.

A vehicle framework structure 218 of a second comparative example is a structure in which front side members are joined to a dash cross-member through joint members. As illustrated in FIG. 8, in the second comparative example, joint members 260 are each joined to a vehicle rear end of respective front side members 220 extending in the vehicle front-rear direction. The joint members 260 each have a flange shaped extension plate 262 that extends in the vehicle vertical direction and the vehicle width direction. The joint members 260 abut a dash cross-member 250 that extends in the vehicle width direction, and the front side members 220 are joined to the joint members 260 abutting the dash cross-member 250 by fastening bolts 270 that pass through in the vehicle front-rear direction.

In the vehicle framework structure 218 of the second comparative example, there are no portions where members overlap in the vehicle width direction at the locations where the joint members 260 and the dash cross-member 250 are joined. Force input in the vehicle vertical direction and the vehicle width direction must accordingly be withstood by the bolts 270 alone. It is therefore difficult to improve coupling rigidity in the vehicle framework structure 218 of the second comparative example. Moreover, in the second comparative example, there is poor work efficiency due to needing to pass the bolts 270 through in the vehicle front-rear direction while avoiding the front side members 220.

A vehicle framework structure 318 of a third comparative example is a structure in which front side members are inserted into by projections provided at a dash cross-member to join the front side members to the dash cross-member. As illustrated in FIG. 9, in the third comparative example, polygonal pillar shaped projections 352 projecting toward the vehicle front are formed to the vehicle front side of a dash cross-member 350 that extends in the vehicle width direction. Moreover, rear ends 320R of polygonal tube shaped front side members 320 extending in the vehicle front-rear direction are inserted into by the projections 352. The front side members 320 are then joined to the dash cross-member 350 by fastening bolts 370, which are arranged in two rows along the vehicle front-rear direction and at two levels in the vehicle vertical direction, and have been passed through overlapping locations of the front side members 320 and the projections 352 in the vehicle width direction.

In the vehicle framework structure 318 of the third comparative example, the coupling rigidity can be improved by increasing the amount of projection of the projections 352 in the vehicle front-rear direction, namely, by increasing the amount of insertion into the front side members 320. However, shortening the length of the front side members 320 not inserted into by the projections 352 decreases the crash stroke in a front-on collision of the vehicle 10. Moreover, the vehicle framework structure 318 has the following issues when applied to couple vehicle body modules together. The respective left and right pair of projections 352 provided at a floor module 316B must be inserted into the left and right pair of front side members 320 provided to a front module 316A at the same time. In such cases, unless there is only a small amount of deviation between the vehicle width direction distance between the centers of the front side members 320 and the vehicle width direction distance between the centers of the projections 352, the projections 352 cannot be inserted into the respective front side member 320 at the same time. This makes it difficult for the front module 316A to accommodate any variation that might arise in the vehicle width direction distance between the centers of the pair of front side members 320.

In contrast to the comparative examples configured as described above, the present exemplary embodiment exhibits the following operation and advantageous effects.

In the first comparative example and the second comparative example, there is no portions that overlap in the vehicle width direction at the locations where the front side member and the member to be joined therewith (the dash panel or the dash cross-member) are joined. In contrast thereto, in the present exemplary embodiment, there are portions, including at the joint members 60, that overlap in the vehicle width direction at the locations where the front side members 20 and the dash cross-member 50 are joined. Moreover, in the present exemplary embodiment, the front side members 20 are welded to the joint members 60 (see FIG. 4 and FIG. 5). Thus in the present exemplary embodiment, not only can force input in the vehicle width direction be withstood, but also force input in the vehicle vertical direction. Namely, the present exemplary embodiment enables coupling rigidity to be improved due to enabling framework members to be overlapped in the vehicle width direction and due to moreover joining with bolts and welding.

In the first comparative example and the second comparative example, it is difficult to adjust positions in the vehicle front-rear direction due to the front side member being abutted and joined to the member to be joined therewith (the dash panel or the dash cross-member). In contrast thereto, the present exemplary embodiment enables positional adjustment of the front side members 20 in the vehicle front-rear direction by adjusting the insertion position of the front side members 20 into the insertion portions 62 of the joint members 60. Namely, the present exemplary embodiment enables assembly precision to be improved.

Moreover, in the second comparative example, the bolts 270 need to pass through vehicle front-rear direction overlapping portions between the joint members 260 and the cross-member 250 in the vehicle front-rear direction. However, the bolts 270 need to be passed through in the vehicle front-rear direction while avoiding the front side members 220. The second comparative example accordingly has poor work efficiency. In contrast thereto, in the present exemplary embodiment, the bolts 70 and the bolts 72 can be fastened, from the vehicle width direction outer side, through the locations where the front side members 20 and the dash cross-member 50 are joined without being affected by other members, improving the work efficiency.

Moreover, in the third comparative example, at places where the front side members 320 and the projections 352 provided at the dash cross-member 350 overlap, the bolts 370, which are arranged in two rows along the front-rear direction and at two levels in the vehicle vertical direction, are fastened from the vehicle width direction. As described above, in the third comparative example, it is easy to secure coupling rigidity by increasing the insertion amount of the projections 352 into the front side members 320; however, the crash stroke decreases therewith. In contrast thereto, in the present exemplary embodiment, the front side members 20 and the dash cross-member 50 are joined by joining the front side members 20 at the insertion portions 62, and by also joining the extension plate 60C formed as a unit with the insertion portions 62 to the dash cross-member 50. Namely, not only are the front side members 20 inserted into and joined to the joint members 60 to be integrated together with the dash cross-member 50, but the joint members 60 that have been integrated together with the front side members 20 are also joined to the dash cross-member 50 through the extension plate 60C. This enables the insertion length of the front side members 20 into the insertion portions 62 to be suppressed in the present exemplary embodiment. Namely, due to enabling the insertion length of the front side members 20 to be shortened, the present exemplary embodiment is able to secure a longer crash stroke in comparison to cases in which the front side members 320 are only joined to the insertion portions, as in the third comparative example.

Moreover, in cases in which the vehicle framework structure 318 of the third comparative example is applied to couple vehicle body modules together, the pair of projections 352 need to be inserted into the pair of front side members 320 at the same time. Namely, in the third comparative example, it is difficult to accommodate any variation arising in the vehicle width direction distance between the pair of front side members 320. In contrast thereto, in the present exemplary embodiment, even if there is variation in the vehicle width direction distance between the pair of front side members 20, fastening the bolts 70 and the bolts 72 from the vehicle width direction outer side when joining the front side members 20 to the dash cross-member 50 enables such variation in the distance to be accommodated. Note that, as described above, the distance L1 (see FIG. 3) between the left and right front side members 20 prior to being joined to the dash cross-member 50 is preferably formed so as to be slightly longer than the distance L2 (see FIG. 4), which is a pre-designed value. This enables the rear end section 20R (joint member 60) of each of the front side members 20 to be moved to a position for joining to the dash cross-member 50 (see FIG. 4) without contacting the projection 52 when the front side members 20 are being joined to the dash cross-member 50.

Note that in addition to the advantageous effects described above, the present exemplary embodiment also exhibits the following advantageous effects.

Namely, in the present exemplary embodiment, the joint members 60 are formed by plate-shaped members including the support plates 60A, the coupling plate 60B, and the extension plate 60C. Specifically, the joint members 60 are formed by cutting an extruded aluminum member having an h-shaped cross-section in plan view. Thus, the present exemplary embodiment enables the number of manufacturing processes to be decreased and cost to be reduced compared to cases in which each of the joint members 60 is formed from plural members.

Moreover, the dash cross-member 50 in the present exemplary embodiment is made of die-cast aluminum. Namely, the dash cross-member 50 of the present exemplary embodiment enables both a higher strength and lighter weight to be achieved.

Second Exemplary Embodiment

Figure 6:
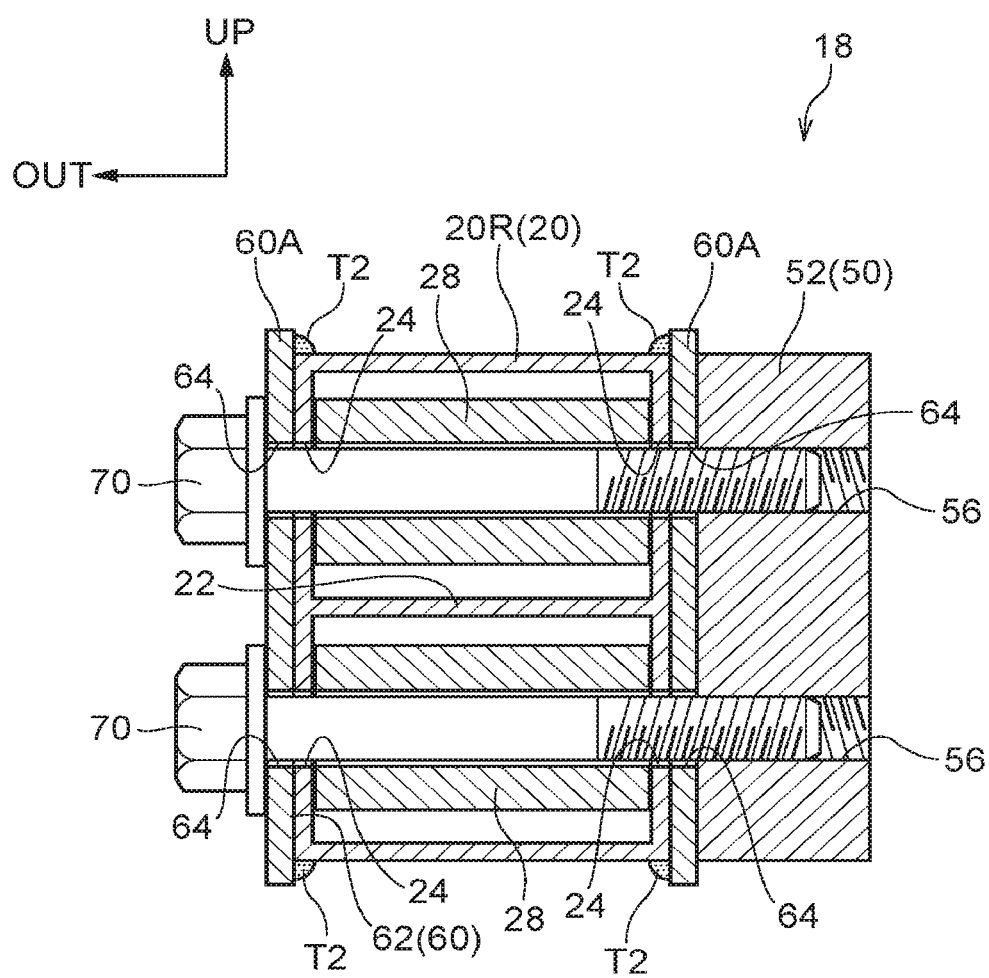
FIG. 6 is a cross-section as viewed from the front of a vehicle framework structure according to a second exemplary embodiment (cross-section corresponding to FIG. 5)

Description follows regarding a vehicle framework structure 18A according to a second exemplary embodiment of the present disclosure, with reference to FIG. 6. Note that the same reference signs are appended to similar configuration to that of the first exemplary embodiment.

As illustrated in FIG. 6, the vehicle framework structure 18A according to the second exemplary embodiment is similar in structure to the first exemplary embodiment, except in that collars 28 that are cylindrical bodies are provided at portions in the front side members 20 of closed cross-section structure where the bolts 70 pass through. In the present exemplary embodiment, the collars 28 are made from metal, and abut opposing inner wall faces of the front side members 20. Due to fastening of the bolts 70, the front side members 20 of closed cross-section structure bear compressional force in the vehicle width direction, this being the direction the bolts 70 pass through. However, in the front side members 20 of the present exemplary embodiment, the vehicle width direction inner wall faces are supported by the collars 28. The bolts 70 are passed through the holes 24 and through the collars 28 in the front side members 20.

The present exemplary embodiment exhibits the following advantageous effects in addition to the advantageous effects of the first exemplary embodiment. Namely, the present exemplary embodiment enables coupling rigidity to be improved in the shear direction (the vehicle width direction) due to enabling deformation of the front side members 20 of closed cross-section structure to be suppressed along the insertion direction of the bolts 70 (the vehicle width direction).

Supplementary Explanation

The present disclosure encompasses the following modified examples in addition to the first exemplary embodiment and the second exemplary embodiment described above. Note that in the present disclosure, a vehicle framework structure may be realized by various combinations of each of the exemplary embodiments and each of the modified examples.

First Modified Example

In each of the exemplary embodiments, the dash cross-member 50, extending in the vehicle width direction, itself functions as a support member to support the front side members 20. However, there is no limitation thereto. For example, in the structure of a first modified example, a support member, this being a separate member, is joined to the vehicle front side of the dash cross-member 50, and the front side members 20 are joined to the separate support member. Note that the support member that is a separate member is not limited to being joined to the dash cross-member, and may be joined to a dash panel, to a floor side member, or the like.

Second Modified Example

At the joint locations in each of the exemplary embodiments, as illustrated in FIG. 4, the projections 52 are provided at the vehicle width direction inner side, and the side face portions 54A and the extension plates 60C that abut the side face portions 54A are provided at the vehicle width direction outer side. However there is no limitation thereto. For example, in the structure of a second modified example, at joint locations between the front side members 20 and the dash cross-member 50, the projections 52 are provided on the vehicle width direction outer side, and the side face portions 54A and the extension plates 60C that abut the side face portions 54A are provided at the vehicle width direction inner side. More specifically, recessed portions recessed toward the vehicle rear may be provided at vehicle width direction central portions of the dash cross-member 50 such that faces on the vehicle width direction outer side of these recessed portions form the side face portions 54A, and the projections 52 may be formed further toward the vehicle width direction outer side than these side face portions 54A. The joint members 60 of the second modified example are joined to the front side members 20 in an orientation in which each of the extension plates 60C is disposed on the support plate 60A at the vehicle width direction inner side from out of the pair of support plates 60A.

Third Modified Example

A third modified example is an example in which a vehicle framework structure of the present disclosure is applied to joining the floor module 16B to a rear module (not illustrated in the drawings). In the third modified example, a cross-member (not illustrated in the drawings) provided to a vehicle rear end of the floor module 16B and serving as a support member, and a rear side member (not illustrated in the drawings), this being a side member provided to the rear module, are joined together. Similar operation and advantageous effects to those of each of the exemplary embodiments described above can be obtained even in applications to joining the floor module 16B and the rear module together.

What is claimed is:
1. A vehicle framework structure, comprising:
a left and right pair of side members that each extend in a vehicle front-rear direction;
a support member that is disposed in close proximity to the pair of side members in the vehicle front-rear direction, and that extends in a vehicle width direction;
projections that are each provided at the support member so as to project toward one or other of the side members;
joint members, an end at a support member side of each of the side members being inserted into a respective one of the joint members and the joint members being joined to the support member; and
first bolts that fasten joint members that are abutted against the projections in the vehicle width direction, and fasten the side members inserted into the joint members, to the projections, wherein:
the support member includes a body section that acts as a base for the projections in a direction opposite to a projection direction of the projections; and the joint members each include:
- an insertion portion into which the respective side member is inserted, and
- an extension portion that extends from the insertion portion toward the body section side and that is configured to abut a face on a vehicle width direction side of the body section.

2. The vehicle framework structure of claim 1, further comprising second bolts that fasten the extension portions to the body section.

3. The vehicle framework structure of claim 1, wherein: the joint members each include:
- a pair of plate-shaped support plates configured to sandwich the side members, and
- a plate-shaped coupling plate that couples ends of the pair of support plates, on the body section side, together; and
- each extension portion is a plate portion that extends from the respective coupling plate toward the body section side.

4. The vehicle framework structure of claim 1, wherein the joint members are each formed from an extruded aluminum member.

5. The vehicle framework structure of claim 1, wherein the support member is made from die-cast aluminum.

6. The vehicle framework structure of claim 1, further comprising welded portions that fix the side members to the joint members.

7. The vehicle framework structure of claim 1, wherein:
- the side members each have a closed cross-section structure; and
- the first bolts are inserted through cylindrical bodies that are each made from metal and abut opposing inner wall faces of the respective side member.

8. The vehicle framework structure of claim 7 wherein the side members each include a rib that divides the side members into a top and a bottom.

* * * * *